O. P. NOISOM & H. KOONTZ.
ELECTRIC CIRCUIT CONTROLLER.
APPLICATION FILED JULY 17, 1912.

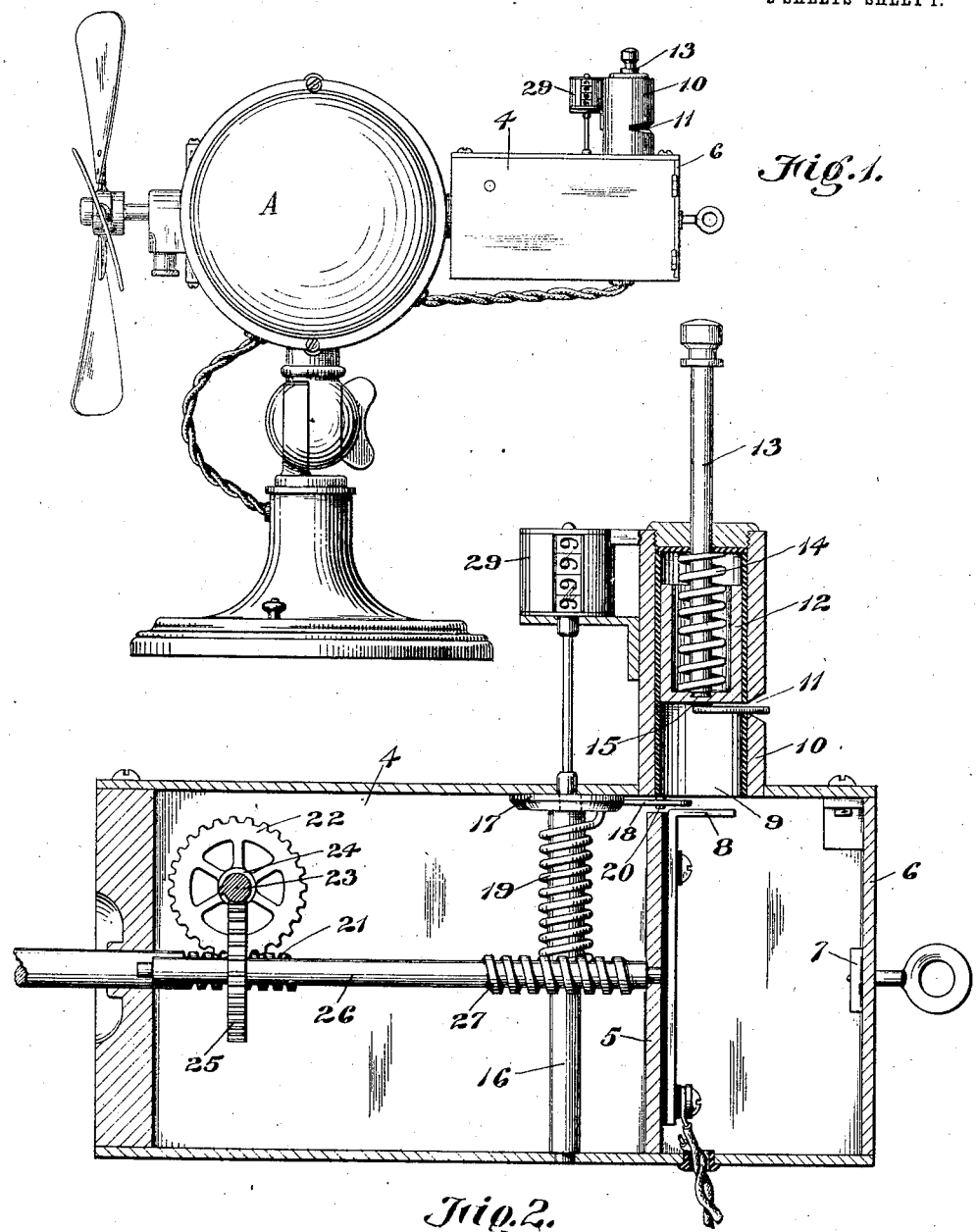

1,047,112.

Patented Dec. 10, 1912.

2 SHEETS—SHEET 2.

Witnesses

Inventors
Ole P. Noisom
Harvey Koontz

By Victor J. Evans
Attorney

UNITED STATES PATENT OFFICE.

OLE P. NOISOM AND HARVEY KOONTZ, OF SOUTH BEND, INDIANA.

ELECTRIC-CIRCUIT CONTROLLER.

1,047,112.  Specification of Letters Patent.  Patented Dec. 10, 1912.

Application filed July 17, 1912. Serial No. 709,960.

*To all whom it may concern:*

Be it known that we, OLE P. NOISOM and HARVEY KOONTZ, citizens of the United States of America, residing at South Bend, in the county of St. Joseph and State of Indiana, have invented new and useful Improvements in Electric-Circuit Controllers, of which the following is a specification.

This invention relates to improvements in electric circuit controllers and has particular application to prepayment controllers.

In carrying out the present invention, it is our purpose to provide a device of the type set forth wherein by means of a coin, the electric circuit may be closed for a predetermined interval and wherein, when such interval has elapsed, the circuit will be automatically broken.

It is also our purpose to provide an electric circuit controller wherein by means of a coin, the electric circuit may be closed for a predetermined interval and wherein such circuit will be opened when the prescribed interval has passed, means being provided to feed a plurality of coins successively so that the circuit may be maintained closed for any desired period of time.

In the present instance, our invention is directed more particularly to a circuit controller for electric fans wherein by means of a prepayment attachment, the electric circuit to the fan motor may be closed for a certain length of time and wherein such circuit will be broken after the armature of the motor has made a given number of revolutions, means being provided for controlling the flow of current to the motor independently of the prepayment attachment after the coin has been inserted therein.

With the above and other objects in view, the invention consists in the construction, combination and arrangement of parts hereinafter set forth in and falling within the scope of the claims.

Figure 3:
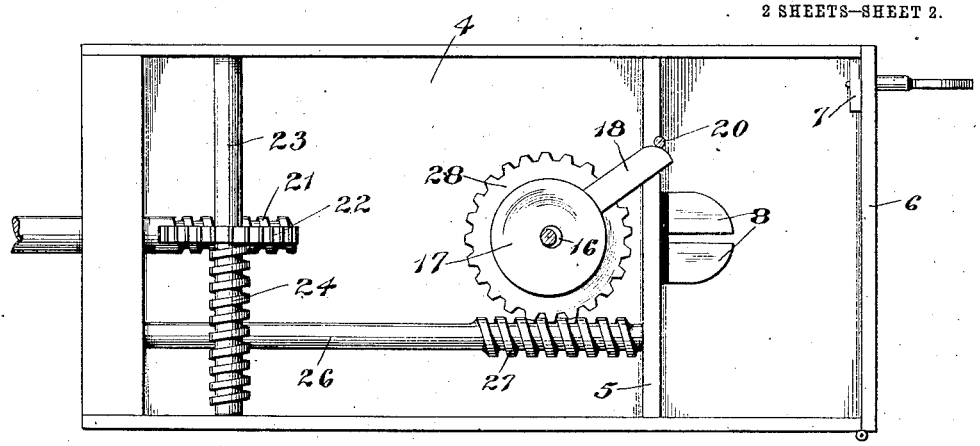
Figure 4:
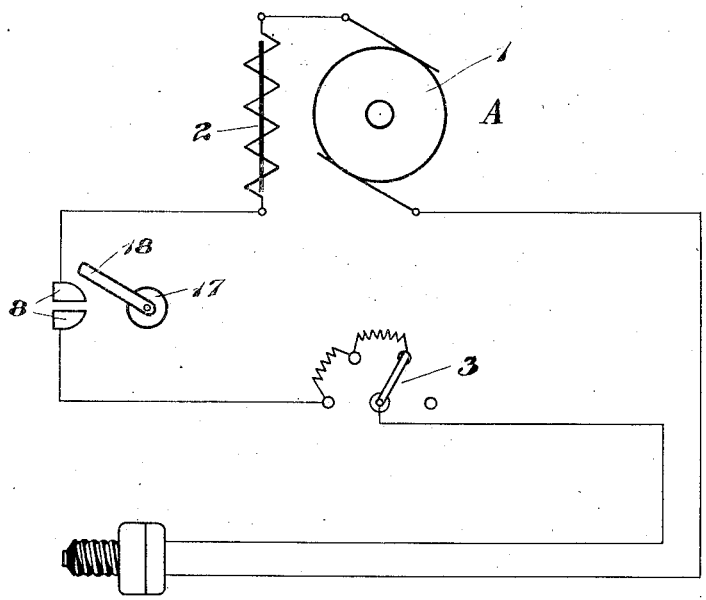

In the accompanying drawings; Figure 1 is a side elevation of an electric motor equipped with the present invention. Fig. 2 is an enlarged vertical central section view through the prepayment attachment or circuit controller. Fig. 3 is a top plan view of the casing inclosing the mechanism of the circuit controller, the top plate, counter and coin magazine being removed. Fig. 4 is a diagrammatic view.

In the embodiment of our invention selected for illustrative purposes, we have shown our improved electric circuit controller as applied to a series wound motor, that is a motor wherein the field and armature are connected in series. It is to be understood, however, that the invention in its useful application is not limited to any particular type of motor, as the same is equally applicable to motors of the shunt and compound wound type. Furthermore, our invention may be utilized wherever necessary for controlling an electric circuit.

Referring now to the accompanying drawings in detail, A designates an electric fan motor as an entirety which, in the present instance, includes an armature 1 and a field 2 connected in series with the armature, as clearly shown in Fig. 4. Arranged in the motor circuit is a suitable form of hand rheostat 3 adapted to vary the flow of current to the motor and capable of breaking the circuit to the motor and placing such motor in the circuit with the resistance of the rheostat cut out, as is well understood.

Secured in any suitable manner to the rear end of the motor casing, that is the end opposite the fan blades, is a housing 4 constructed of any suitable material and of any preferred shape and designed to house or incase the mechanism of the circuit controller and receiving the respective extremity of the armature shaft. Arranged within the casing 4 and connected to the bottom and side walls thereof in any suitable manner is a partition 5 having the upper edge thereof spaced apart from the adjacent surface of the upper wall of the housing. The free end wall of the housing 4 is preferably provided with a hinged closure or the like 6 equipped with a lock 7 and such end wall and the adjacent surface of the partition 5 form the coin receptacle, the door enabling access to be had to the receptacle so that the coins therein may be removed when desired. Appropriately fastened to the receptacle forming wall of the partition 5 are a pair of contacts 8, 8 suitably spaced apart and, in the present instance, formed of angle strips having the vertical limbs thereof secured to the partition, while the horizontal limbs thereof extend into the coin receptacle immediately below the upper wall thereof.

One of the conductors of the electric circuit is split or cut and the proximate terminals of the split portion are connected to the contact strips 8, 8. Thus, the motor circuit including the field and armature is open unless the contact strips 8, 8 are bridged. Formed in the upper wall of the housing 4 in alinement with the horizontal limbs of the contacts 8, 8 is an aperture 9 and suitably fastened to such wall and coaxial with the aperture therein is a coin magazine 10 having a coin slot 11 formed in the wall thereof and housing a plunger 12 provided with a stem 13 extending outwardly of the upper wall of the magazine, a coiled expansion spring or the like 14 encircling the stem between the upper surface of the plunger and the adjacent wall of the coin magazine and acting, normally, to hold the plunger at its limit of downward movement within the coin magazine, the end of the plunger adjacent the contacts having an insulated nib 15. When it is desired to close the motor circuit at the contacts 8, 8 irrespective of the rheostat 3, a coin such, for instance, as a "dime" is inserted in the slot 11, the plunger 12 having been previously elevated within the magazine to the position shown in Fig. 2. Succeeding the introduction of the coin into the magazine, the plunger is forced downwardly under the action of the spring 14 to securely hold the coin on the horizontal limbs of the contacts 8, 8 thereby bridging the motor circuit. By manipulating the hand rheostat, the speed of the armature may be regulated or controlled at will and the current cut off independently of the bridged contacts, if such is desired, the motor being thereby under the control of the consumer after the coin has been inserted in the magazine.

In order to eject the coin or dislodge the same from the contacts so as to break the circuit at a predetermined time, in the present instance, after the motor armature has made a given number of revolutions, we employ means operable from the armature shaft and adapted to dislodge the coin from the contacts after the armature has made a predetermined number of revolutions. This means, in the present instance, comprises a coin shaft 16 arranged vertically within the housing 1 at an appropriate distance from the partition 5 on the other side of the coin receptacle and having its opposite ends journaled in the top and bottom walls of the housing. Loose upon the upper end of the shaft 16 and eccentrically mounted thereon is a disk 17 provided with a radially extending ejector pin 18 and adapted to rotate with the shaft 16. Suitable tension means is employed to effect a connection between the disk 17 and the shaft 16 so that under certain conditions the disk will rotate with the shaft and in the present instance this tension device consists of a spring 19 coiled about the shaft and having one extremity fastened thereto while the opposite extremity is fastened to the disk. Secured to the top wall of the housing and projecting inwardly thereof is a pin or lug 20 disposed in the path of movement of the ejector pin 18 and adapted to be engaged by the ejector pin in the path of movement thereof whereby the disk will be held against movement under the action of the shaft 16 and placed under tension, incident to the coiling of the spring 19 about the shaft. By means of this construction, it will be seen that the ejector pin will rotate with the coin shaft and engage the stop lug 20, the lug being positioned beyond the peripheral edge of the coin on the horizontal limbs of the contacts 8, 8. Thus, when the spring 19 has been put under sufficient tension, the disk and ejector pin will be relieved of the influence of the stop lug and rotated with "a snap" thereby kicking the coin from the contacts 8. The coin magazine 10 is of such length as to accommodate a plurality of coins so that as one coin is dislodged the following coins may be placed on the horizontal limbs of the contacts, under the action of the follower or plunger, thereby enabling the fan to be constantly rotated, without the necessity of retracting the plunger each time that a coin is dislodged from the contacts.

In order to rotate the coin shaft 16 so that the ejector pin 18 will actuate but once in so many revolutions of the armature shaft, a step down gear system is employed, and in this embodiment of our invention, embodies a worm 21 on the free end of the armature shaft meshing with a worm gear 22 secured upon a jack shaft 23 journaled in the housing and carrying a worm 24 meshing with a worm gear 25 secured upon a second jack shaft 26 also journaled in the housing and at right angles to the shaft 23, the shaft 26 carrying a worm 27 meshing with a worm gear 28 keyed to the coin shaft 16. By means of this step down gear system, it will be seen that the coin shaft revolves but once to a given number of revolutions of the armature shaft. For example, let it be assumed that the armature shaft revolves 1,750 R. P. M. and it is desired to rotate the coin shaft once every half hour to displace the coin, assuming, of course, that the armature is revolving under full current. To effect this movement of the coin shaft from the armature shaft, the ratio between the latter shaft and the coin shaft is 52,500 revolutions to 1. Thus, the armature shaft under full current strength will revolve 52,500 revolutions in one-half hour to one revolution of the coin shaft. Previous to the coin shaft making a complete revolution, the ejector pin abuts the stop 20 in the path of movement thereof and thereby places the disk 17 under tension so that when the coin shaft has made a complete revolution, the ejector pin will be released from the stop lug and thereby dislodge the coin from the contacts. The ejector pin in this operation will be thrown to the opposite side of the contacts so that the following coin may engage the contacts, under the action of the plunger, and bridge the circuit.

A suitable counter 29 is fastened to the upper extremity of the coin shaft on the upper surface of the housing so that the number of revolutions of the coin shaft may be registered.

From the foregoing description taken in connection with the accompanying drawings, the construction, mode of operation and manner of employing our invention will be readily apparent. It will be seen that we have provided a circuit controller whereby the circuit is bridged by a coin and remains closed for a predetermined length of time and whereby the circuit is opened automatically at the expiration of such time.

While we have herein shown and described one particular embodiment of our invention by way of illustration, we wish it to be understood that we do not confine ourselves to the precise details of construction herein described and delineated, as modification and variation may be made within the scope of the claims and without departing from the spirit of the invention.

Furthermore, it is to be understood that we do not limit ourselves to the particular application of the invention as herein shown, as our improved circuit controller may be applied to various other electrically operated machinery for controlling the flow of current thereto.

Although we have described our invention as employing coins, it is conceivable that other forms of checks such as slugs and the like may be utilized.

We claim:

1. The combination with an electrically actuated device including a movable element, of a circuit for said device and having a pair of contacts therein spaced apart and adapted to be bridged by a check, means for removing the check at a predetermined time, said means comprising a coin shaft, a gear system intermediate said coin shaft and the movable element of said device for operating the former from the latter, and an ejector pin mounted upon the coin shaft and adapted to rotate therewith, means for holding said pin stationary, and tension means interposed between said coin shaft and ejector pin and adapted to place the pin under tension in the independent movement of the coin shaft whereby the pin will be relieved of the influence of the holding means to eject the check from the contact.

2. The combination of electric motor, a circuit therefor having a pair of contacts therein spaced apart and adapted to be bridged by a coin, means for removing the coin at a predetermined number of revolutions of the motor armature, said means comprising a coin shaft, a step down gear system intermediate the armature shaft and coin shaft for operating the latter at relatively less speed than the former, and an ejector pin mounted eccentrically upon the coin shaft and adapted to rotate therewith, means for holding said pin stationary, and tension means interposed between said coin shaft and ejector pin and adapted to place the pin under tension in the independent movement of the coin shaft, whereby the pin will be relieved of the influence of the holding means to eject the coin from the contacts.

3. The combination of an electric motor, a circuit therefor having a pair of contacts therein spaced apart and adapted to be bridged by a coin, means for removing the coin at a predetermined number of revolutions of the motor armature, said means comprising a coin shaft, a step down gear system intermediate the armature shaft and coin shaft for operating the latter at relatively less speed than the former, an ejector pin mounted eccentrically upon the coin shaft and adapted to rotate therewith, means for holding said pin stationary, tension means interposed between said coin shaft and ejector pin and adapted to place the pin under tension in the independent movement of the coin shaft, whereby the pin will be relieved of the influence of the holding means to eject the coin from the contacts, and means for feeding coins to said contacts successively.

4. The combination of an electric motor, a circuit therefor having a pair of contacts therein spaced apart and adapted to be bridged by a coin, means for removing the coin at a predetermined number of revolutions of the motor armature, said means comprising a coin shaft, a stepped down gear system intermediate the armature shaft and coin shaft for operating the latter at relatively less speed than the former, an ejector pin mounted eccentrically upon the coin shaft and adapted to rotate therewith, means for holding said pin stationary, tension means interposed between said coin shaft and ejector pin and adapted to place the pin under tension in the independent movement of the coin shaft, whereby the pin will be relieved of the influence of the holding means to eject the coin from the contacts, and means for feeding coins to said contacts successively, said last-named means comprising a coin magazine having a slot therein and disposed in alinement with the contacts, and a plunger within the magazine and in engagement with the coins therein.

5. The combination with an electric motor, of a circuit therefor having a pair of contacts therein spaced apart and adapted to be bridged by a coin, means for removing the coin at a predetermined number of revolutions of the motor armature, said means comprising a coin shaft, a step down gear system intermediate the armature shaft and coin shaft for operating the latter at a relatively less speed than the former, an ejector pin mounted upon the coin shaft and adapted to rotate therewith, means for holding said pin stationary, tension means interposed between said coin shaft and pin and adapted to place the pin under tension in the independent movement of the coin shaft whereby the pin will be relieved of the influence of the holding means to eject the coin from the contacts, and means for controlling the flow of current to said circuit while the contacts are bridged.

In testimony whereof we affix our signatures in presence of two witnesses.

OLE P. NOISOM.
HARVEY KOONTZ.

Witnesses:
  ALONZO N. MILLER,
  ORIE PARKER.